(Model.)

D. F. SPANGLER.
DEVICE FOR SHARPENING PLOWSHARES.

No. 246,917. Patented Sept. 13, 1881.

Witnesses:
M. M. Lacey
A. Parker

Inventor.
David F. Spangler
By R. S. & A. P. Lacey
Att'ys.

UNITED STATES PATENT OFFICE.

DAVID F. SPANGLER, OF DAYTON, WASHINGTON TERRITORY.

DEVICE FOR SHARPENING PLOWSHARES.

SPECIFICATION forming part of Letters Patent No. 246,917, dated September 13, 1881.

Application filed May 26, 1881. (Model.)

*To all whom it may concern:*

Be it known that I, DAVID F. SPANGLER, a citizen of the United States, residing at Dayton, in the county of Columbia, Washington Territory, have invented certain new and useful Improvements in Devices for Sharpening Plowshares; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention has for its object to provide a cheap and efficient device for sharpening plow shares and points.

It consists in a head-block having a semicircular slot or opening formed therein and a cam operated by suitable levers and working against an opposing cam-surface and pivoted between the jaws of the head-block, the two cams being arranged to come together within the semicircular slot, all of which will be hereinafter fully described.

Figure 1:
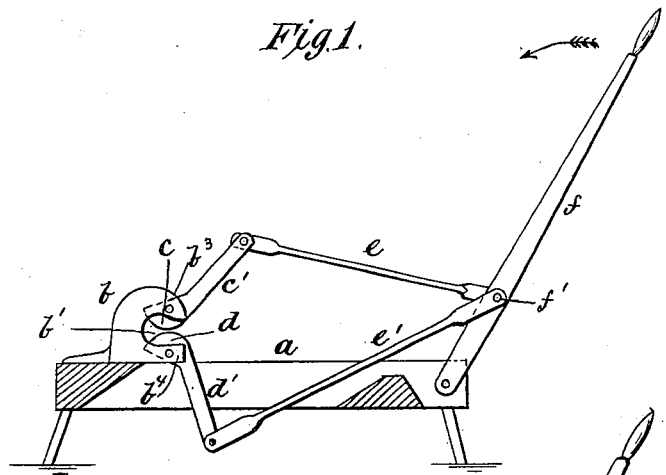
Figure 2:
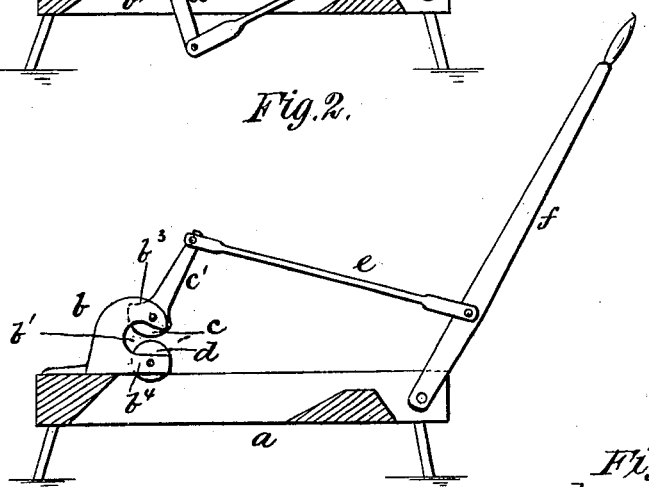
Figure 4:
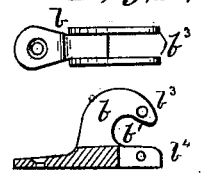
Figure 3:
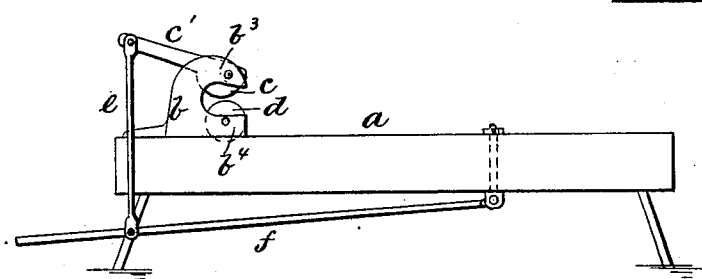

In the drawings, Figure 1 is a side elevation of my device, the supporting-frame being in section to show more clearly the arrangement of the parts. Fig. 2 shows a modification. Fig. 3 shows a different arrangement of the operating-levers; and Fig. 4 shows the slotted head-block.

$a$ represents the sill or frame, on which my improvements are supported. The sill is provided with suitable vertical mortises or openings to permit the free operation of the several parts of the device.

$b$ is the head-block, which is provided with suitable lugs by which it may be bolted fast to the sill. I have formed in it a horizontal semicircular opening, $b'$, and a vertical slot, $b^2$, all so arranged as to provide two pairs of jaws—an upper pair, $b^3$, and an under pair, $b^4$—with the opening $b'$ between the said pairs of jaws. Between the upper pair of jaws there is journaled a cam, $c$, which extends slightly down into the cross-opening $b'$. It is provided with and is turned by a lever-arm, $c'$.

$d$ is a rotating block or cam, pivoted between the under pair of jaws, $b^4$, and arranged to stand directly opposed to the cam $c$. This opposing block may be cam-shaped, as shown in Fig. 1, and operated by a lever-arm, $d'$, or it may be a solid cylinder turning on a journal, as shown in Figs. 2 and 3. I prefer to make it as shown in Fig. 1, and operate it by the same mechanism that operates the cam $c$.

To the lever-arms $c'$ $d'$ of the cams $c$ and $d$ I connect one end of the pitmen $e$ $e'$, the other ends of which are connected to a lever, $f$, pivoted to the sill $a$. The ends of the pitmen are pivoted, by preference, at the same center or point $f'$ on lever $f$. The under pitman, $e'$, is made a little longer than the upper pitman, $e$, and the pivoted center $f'$ being slightly above the plane of the contiguous surfaces of the two cams $c$ and $d$, a greater rotating movement will be given to the surface of cam $d$ than to cam $c$.

The edge of the share is laid between the cams when in the position shown in Fig. 1. Then by drawing the lever $f$ in the direction of the arrow, or toward the block $b$, the edge will be pressed and drawn out to any desired thinness, and will be made perfectly smooth by the turning movement of the cams. In the devices shown in Figs. 2 and 3 the under cam does not turn, except when the share is being placed or being removed from the device it turns slightly to facilitate the movement.

In Fig. 3 is shown a different arrangement of the lever and pitman, by which the workman can operate the cam by his foot, the lever $f$ being arranged to serve as a treadle.

Having described my invention, what I claim, and desire to secure by Letters Patent, is—

The combination, substantially as hereinbefore set forth, of the head-block $b$, having the semicircular slot $b'$ and jaws $b^3$ $b^4$, the opposing cam or block $d$, the cam $c$, provided with a lever-arm, $c'$, pitman $e$, and lever $f$, all arranged on a suitable base, and operated substantially as and for the purpose set forth.

In testimony whereof I affix my signature in presence of two witnesses.

DAVID F. SPANGLER.

Witnesses:
 R. F. STURDEVANT,
 JOHN W. NORRIS.